Figure 1:
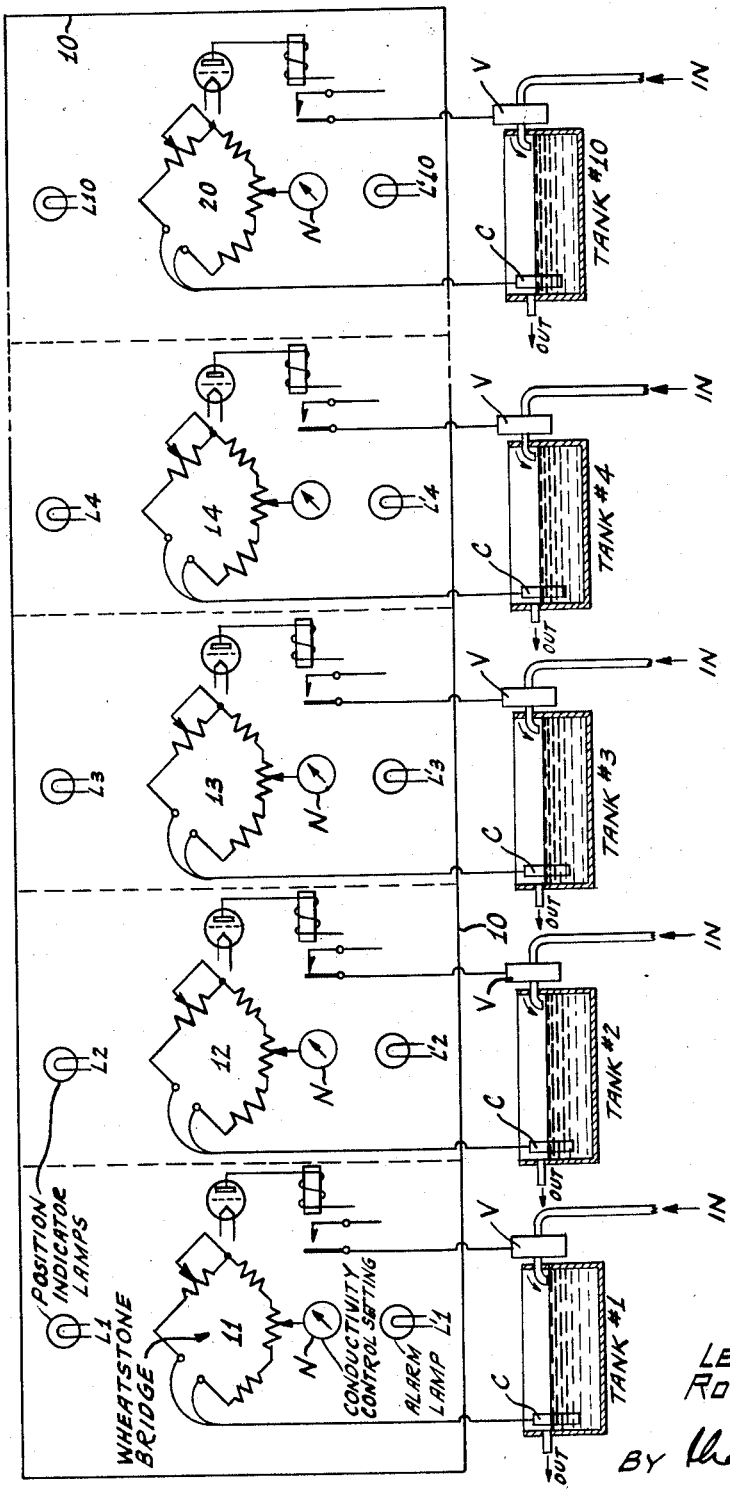

INVENTORS
LEO C. CUNNIFF &
ROBERT ROSENTHAL
BY Charles H. Brown
ATTORNEY

United States Patent Office 2,928,406
Patented Mar. 15, 1960

2,928,406

SOLUTION CONDUCTIVITY MEASURING AND CONTROLLING APPARATUS

Leo C. Cunniff, Cliffton, and Robert Rosenthal, Tenafly, N.J., assignors to Industrial Instruments, Inc., Cedar Grove, N.J., a corporation of New Jersey Application June 22, 1956, Serial No. 593,084

12 Claims. (Cl. 137—5)

This invention relates to solution conductivity measuring and controlling apparatus, and more particularly to such apparatus for automatically controlling the admission of a liquid into a plurality of tanks to thereby maintain the liquid contents of such tanks at a particular purity or chemical concentration.

The invention is especially applicable to electroplating apparatus for automatically controlling the rinsing operation in such manner as to maintain exact minimum concentration of chemicals in the rinse tanks. In order to prevent rinse tank contamination it is often the practice to provide an uncontrolled flow of clean water into the tank. This flow of water occurs during a large percentage of the time when it is not needed, as a result of which the water is wasted and the cost of operation unnecessarily increased. Rinse water is used most effectively when it is flowing with the maximum allowable concentration of chemicals in the rinse. A specific flow rate will maintain this concentration if the work load is steady. Any flow greater than this results in the wastage of excess water down the drain. The automatic control (starting and stopping) of rinse water reduces the requirements for water lines and drainage to a minimum and results in appreciable economy of operation.

In the use of electroplating apparatus, it is often necessary to employ several rinsing tanks to assure an absolute minimum of contamination in the tanks and a resulting high degree of cleanliness of the article to be plated before the article is immersed in the plating tank or both. Different qualities of plating require different qualities of water. The degree of contamination is established by the care exercised in reducing "dragout" from one rinse tank to the next. Some rinse tanks require a higher degree of pure water than others.

An object of the present invention is to enable the automatic and continuous control of the electrolytic conductivity of a plurality of tanks or baths in desired concentrations, while simultaneously indicating the conditions of the various tanks.

Another object is to provide simple, inexpensive and reliable apparatus for continually sequentially testing the purity of rinse water in a plurality of tanks and automatically controlling the amount of clean water individually admitted into the tanks.

A further object is to enable the continual monitoring and automatic control of the chemical concentrations of rinse water in a multiplicity of rinse tanks in electroplating apparatus by improved electrical circuits.

Another object is to provide simple and reliable apparatus for continual testing the purity of rinse water in a tank, automatically controlling the amount of clean water admitted into the tank, and simultaneously indicating when water is being so admitted.

The foregoing objects and others which will appear as the description proceeds, are achieved by the provision of cycling or sampling apparatus including an electrical controller. This controller is provided with at least as many Wheatstone bridge circuits as there are rinse tanks to be controlled, each bridge containing a measurement circuit and an electronic relay circuit operated by the unbalance of the bridge. One leg of the measurement circuit of each bridge includes an external conductivity cell which is remotely immersed in the rinse tank associated therewith. Variations of chemical concentration of rinse water affect this cell which, in turn, changes the bridge measurement current. The electronic relay circuit operates when the concentration of rinse water in the tank circuit to which it is connected by the conductivity cell exceeds or drops below a predetermined setting individual to this tank. Associated with each Wheatstone bridge and associated rinse tank is a water valve controlled by the bridge for admitting fresh water to the particular tank.

By presetting the different bridge circuits to different concentrations or degrees of quality of the rinse water, and using a timing device to scan the conductivity cells in succession, the tanks are automatically and continually monitored for equal time periods and controlled. Each Wheatstone bridge circuit is scanned for about 10 seconds during each cycle of operations. If there are 12 such bridge circuits in the controller, it takes about $12 \times 10$ seconds or 2 minutes for a complete cycle of operations. This enables as many different presettings or degrees of concentration (percentages of water purity) as there are bridges or tanks. By way of example, if during the scanning process bridge #1 detects contaminations in the rinse tank which requires purer water, the valve for this tank will be opened to supply water from the water supply. After a complete cycle of operations, this same bridge circuit will again be scanned for 10 seconds. If, at this time, the cell for this bridge responds to indicate the desired purity, the bridge will shut off its valve; otherwise the valve will remain open for another cycle of operations (two minutes) at which time the bridge #1 will take another test of the tank to determine whether or not to shut off the water valve thereto. The other bridges work similarly and in succession.

Each bridge has associated therewith two lights, one to indicate which bridge is being scanned at that time (i.e. which tank is being monitored) and the other to indicate whether the valve is supplying water to its tank. As long as a valve is supplying water to its particular tank, the light associated with that valve will be lit (illuminated) even though another bridge is being scanned.

In order to be able to ascertain the condition of any one specific tank at any particular time there is provided a manual means for stopping the automatic cycling and stepping the scanning to the position corresponding to a desired tank to be tested. Scanning is stopped on the position corresponding to this particular tank until other manual means restores the automatic operation.

Figure 2:
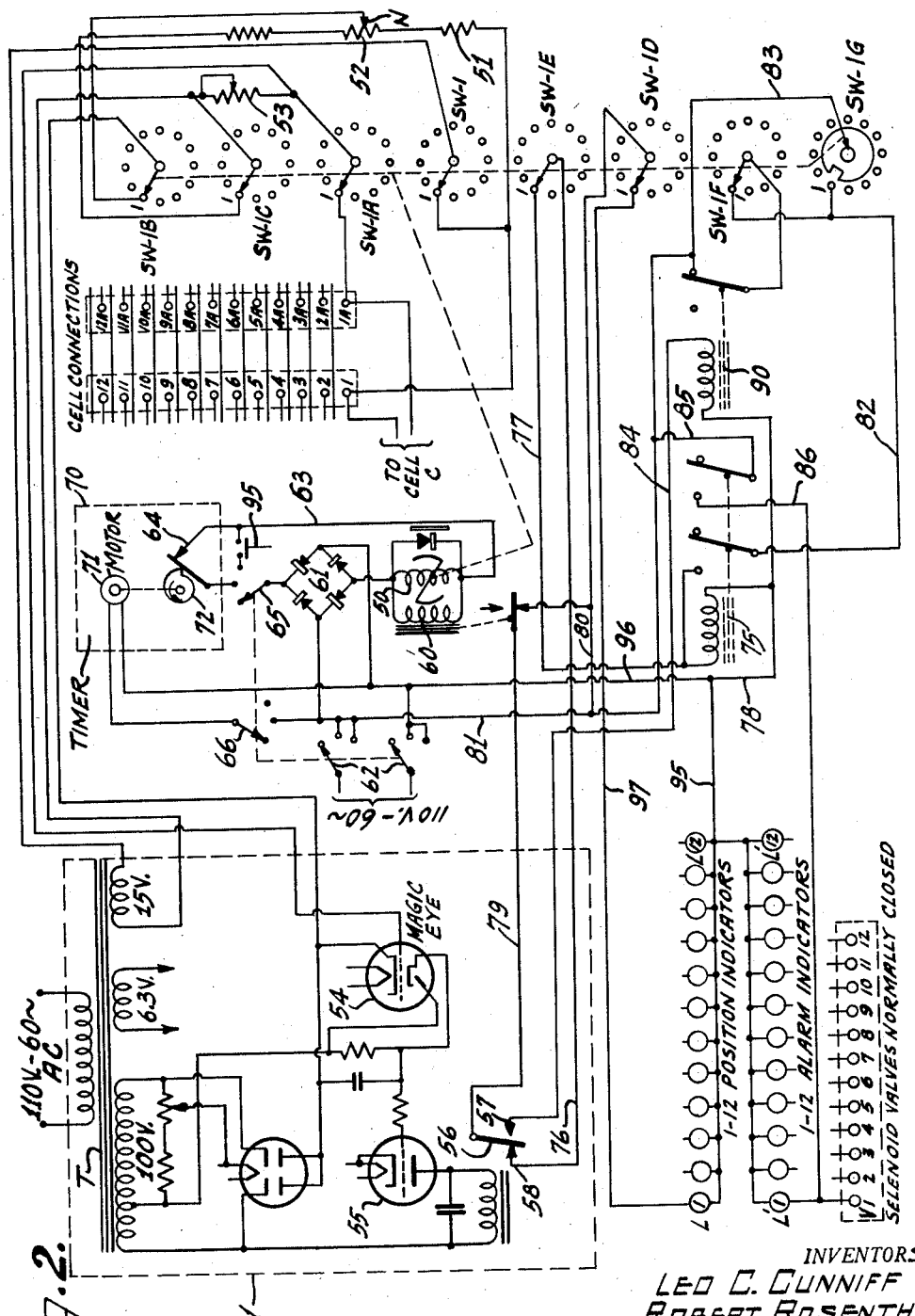

A more detailed description of the invention follows, in conjunction with drawings, wherein:

Fig 1 illustrates, in block form, the use of the invention for automatically controlling the concentration of solutions in a plurality of tanks or baths, while simultaneously indicating which specific tank is being tested or sampled and which tanks are being supplied with liquid to restore or maintain substantially constant the desired chemical or electrical conditions within the tanks; and Fig. 2 illustrates the circuit details of the electrical controller of the invention and the method of sequentially sampling the different tanks.

Referring to Fig. 1 of the drawings, the automatic multiple rinse tank controller of the invention comprises a housing 10 containing therein a plurality of Wheatstone bridge controller circuits 11 to 20 inclusive, controlling the flow of water in an equal number of tanks or baths 1 to 10 respectively. These tanks form part of electroplating apparatus, and each tank is electrically coupled to its associated bridge circuit by a conductivity cell C which measures the electrolytic conductivity of the rinse water in the tank. Automatic control of the amount of fresh or clean water admitted into the rinse tank is accomplished by a solenoid valve V under control of the output of the Wheatstone bridge controller for that particular tank.

It should be noted that each tank has associated therewith an individual bridge controller 11 or 12 etcetera, including a conductivity cell C and a solenoid valve V, as well as a pair of lamps L1 and L'1 or L2 and L'2, etc. These lamps are located on the panel and visible to the operator. The bridge controller comprises a line voltage energized A.C. Wheatstone bridge employing an "electronic eye" as null indicator. It contains a measurement circuit and a vacuum tube relay circuit directly operated by unbalance of the bridge circuit. One leg of the measurement circuit is the external conductivity cell C which is remotely immersed in the rinse tank. Variations of chemical concentration of rinse water affect this cell which, in turn, changes the bridge measurement current. The vacuum tube relay circuit operates when the concentration of rinse water exceeds or drops below the pointer setting of the conductivity control knob N on the controller panel. The operation of the relay circuit energizes the associated solenoid valve which then admits enough fresh water to affect the immersed cell and rebalance the bridge circuit, whereupon the solenoid valve again closes as outlined in more detail later. The bridge thus automatically causes the contaminated rinse water to be replaced with just the right amount of fresh or clean water. The bridge is sensitive to slight changes in rinse water conductivity beyond the control setting and keeps the rinse water replenished within close limits. The rinse tank conductivity setting of each tank is maintained by its own knob N independently of the knob settings for the other tanks. The solenoid valves are preferably electrically operated and supplied with water from a water supply or tap through inlet pipes labeled IN.

An important feature of the invention is the provision of a sampling or switching circuit for sequentially measuring or testing the different tanks or baths, whereby the cells and bridge circuits are switched into the controller circuit on a program basis, at the same time switching solenoid valves. A timing mechanism sequentially connects the automatic controller of the invention to each tank for a predetermined period of time; for example six to 10 seconds. If during this period in which a bridge circuit is operatively coupled to its tank, the tank calls for rinse water, the proper valve will operate and continue to operate at least until the program timer returns to this same tank on its next cycle of operations. If the conductivity condition has been satisfied when the tank is sampled on the second cycle, the valve will operate to shut off the water to the tank; otherwise the water will continue to be admitted into the tank until the next or a succeeding cycle. The sampling or switching circuit for sequentially coupling the different Wheatstone bridge circuits to their respective tanks is not shown in Fig. 1 in order not to detract from the clarity of the drawing but is shown in Fig. 2, and takes the form of a stepping magnet having a plurality of arcuate rows of contacts.

The illumination of one (or more) of the indicator lamps L1 to L10 show which one (or more) particular rinse tank is being measured or sampled at that time. The alarm lamps L'1 to L'10 show whether or not any given tank is calling for water or not calling for water.

Fig. 2 shows the details of the automatic rinse tank controller of the invention for automatically and continually measuring and controlling the electrolytic conductivity of the rinse water of a plurality of tanks. The system sequentially measures the tanks for equal time periods, for example ten seconds for each tank, during each cycle of operations, and automatically admits water to or shuts off the water flow to the tanks on an individual basis during the time period in which the conductivity of the water in the tank is being measured.

The system of the invention employs a rotary stepping magnet having a rotary solenoid 50 and eight rows of arcuate contacts SW1, SW1A, SW-1B to SW-1G inclusive. Each arcuate row of contacts is provided with twelve contacts for separate connection to twelve different Wheatstone bridge controller circuits. The rotary stepping magnet serves to operatively couple the different Wheatstone bridge circuits sequentially to their respective tank circuits.

Only one Wheatstone bridge circuit within the dotted line box 11 is shown connected to the stepping magnet through the number 1 contacts on the different rows of contacts. It should be understood, however, that the other eleven Wheatstone bridge circuits are similarly coupled to the stepping magnet, although to respectively different contacts on the arcuate rows of the rotary stepping magnet.

Each Wheatstone bridge comprises four arms as indicated in Fig. 1. One arm is the conductivity cell C connected across terminals 1 and 1A for this particular bridge (it is understood that the cell for the next bridge is connected to terminals 2 and 2A, and so on). The other three arms of the bridge are resistors 51, 52 and 53. Resistor 53 is also used as a temperature compensating potentiometer. A variable tap N on resistor 52 enables the bridge to be set to a particular adjustment corresponding to the conductivity point or concentration of the solution desired in the tank to be controlled. A "magic eye" electron tube 54 replaces the usual delicate galvanometer across one diagonal of the bridge. The other diagonal of the bridge is supplied with 15 volts A.C. from the 15 v. secondary coil on the power transformer T, the primary coil of which is supplied with 110 volts-60 cycle power from the mains. In circuit with the bridge is a vacuum tube relay 55 controlling the operation of an armature 56 positioned between a pair of contacts 57 and 58.

In shunt to the rotary magnet coil 50 is an electromagnetic relay 60. One side of the rotary magnet coil 50 is connected to one side of a rectifier network 61, in turn, supplied with alternating current from the 110 volt-60 cycle mains over switch 62. The other side of the rotary magnet coil 50 is connected over lead 63 to contacts 64 which are adapted to be connected to the opposite side of the rectifier network through a switch 65.

A synchronous timing mechanism shown within the dash line box 70 comprises a synchronous motor 71 of the electric clock type linked through a suitable gear mechanism to drive a cam 72. The cam is arranged to close the contacts 64 once during each rotation of the cam in order to advance the stepping magnet to cause it to rest for ten seconds in its new position before it receives another operating pulse. The energization circuit for the motor is closed by switch 66.

It should be noted that switches 62, 65 and 66 are uni-controlled and all have three corresponding switch positions. With all three switches 62, 65 and 66 in the central position, the rotary magnet coil 50 and its shunt connected relay 60 both receive a D.C. operating pulse lasting approximately 10 seconds for each rotation of cam 72. Each time a pulse is fed to the rotary coil 50 it advances the switch arms on the eight arcuate rows of contacts one step. After twelve such steps corresponding to twelve rotations of the cam 72, the stepping magnet will have completed one cycle of operations in 120 seconds (2 minutes). Each time the stepping magnet advances a step another Wheatstone bridge is coupled to its associated conductivity cell remotely immersed into a tank to be measured. It will thus be seen that the Wheatstone bridge circuits are sequentially coupled to their respective cells once for each cycle of operations of the stepping magnet.

Each time the stepping magnet advances one step, the position indicator lamp L for that particular position will become illuminated solely for the duration the magnet is in that position, over a path traced from the bottom terminal of lamp L, leads 95 and 96 to one side of the power supply; also from the other side of lamp L, lead 97, the position contact and switch arm of arcuate row SW-1D, leads 80 and 81, to the other side of the power supply.

The operation of the Wheatstone bridge circuit to automatically control the conductivity of the rinse water in its respective tank will now be described. It is assumed that the bridge circuit is in position 1 of the stepping magnet as shown. It is also assumed that the conductivity cell across terminals 1 and 1A and constituting one arm of the bridge registers an unbalance of the bridge which calls for the admission of water into the tank to restore the balance of the bridge. The unbalance of the bridge will cause electronic relay 55 to operate to the position shown in the drawing where armature 56 and contact 58 engage each other. This position of the armature 56 and contact 58 is termed the rinse position and calls for admission of water into the tank. In this position of electronic relay 55, a circuit is closed to operate relay 75 over a path including contact 58, lead 76, switch arm and contact 1 of arcuate row SW-1E of the stepping magnet, lead 77, winding of relay 75, lead 78 to one side of the power supply; also armature 56 of the electronic relay 55, lead 79, contacts of relay 60, leads 80 and 81 to the other side of the power supply.

When relay 75 operates, it closes a holding circuit through its own make contacts to lock itself up over a path including lead 82, contact 1 and switch arm of arcuate row SW-1F, and break contacts of relay 90. The operation of relay 75 closes a second pair of contacts to apply power over a path including lead 85 and lead 86 to operate the water solenoid valve V1 and alarm lamp L'1.

It should be noted at this time that arcuate row SW-1G is provided with a cut-out or indented portion which prevents its arm from engaging the particular contact in its row corresponding to the position to which the stepping magnet has advanced and is resting in. Thus, in the position 1 shown in the drawing, lead 83 cannot connect with contact 1 of row SW-1G through the rotary arm of SW-1G. The switch arm of SW-1G, however, makes contact with all other contacts in its row except the contact adjacent the cut-out or indented portion. The reason for this arrangement of SW-1G is to enable relay 75 to release during the ten second period the Wheatstone bridge is connected to its associated tank in the event the bridge becomes balanced due to the cell indicating that the rinse water is satisfactory. Switch SW-1G maintains the bypass or holding circuit for relay 75 for all positions except the one adjacent the cut-out or indented portion. If the bridge becomes balanced, the electronic relay 55 will release to cause armature 56 and contact 57 to engage as a result of which relay 90 will operate over a path including the right hand side of relay 90, lead 84, contact 57 and armature 56, lead 79, contacts of relay 60, and leads 80 and 81 to one side of the power supply. The operation of relay 90 will open its contacts and interrupt the holding circuit for relay 75, causing relay 75 to fall back.

When the stepping switch advances to another position, assuming that solenoid valve in the first position has operated, the movement of the stepping switch to another position will not disturb the solenoid valve in position #1 from continuing to supply water to its rinse tank because the relay 75 will be locked-up in position through arcuate switch SW-1G. It should be remembered that when arcuate switch SW-1G advances to a new position the cut-out or indented portion also advances to the next position and enables the switch arm to engage all other contacts in its row.

Assume we now go to position #2 and find the water in the rinse tank to be good, then electronic relay 55 of the next Wheatstone bridge circuit will cause armature 56 and contact 57 to engage. Relay 90 will be energized to open its contact. If previously, the solenoid valve for position #2 had been operated then the operation of relay 90 will open the holding circuit for relay 75 and cause relay 75 to fall back and remove power from the solenoid valve for the tank in position #2. If, however, the solenoid valve for position #2 had not been opened on a previous cycle, then the operation of relay 90 serves no special purpose. It merely opens for the time interval the stepping switch is in position #2.

The relay 60, which is in shunt with the winding of the stepping switch, operates each time the stepping switch advances. The purpose of this is to momentarily remove power (at its contacts when open) from the armature 56 of relay 55 to prevent operation of any solenoid during the switching interval (i.e. during the interval that the stepping switch is moving from position to position). The twelve different relays 75 for the twelve positions of the stepping magnet and the common relay 90 are respectively controlled solely by the electronic relay 55 in the particular bridge circuit associated therewith of the controller which is being measured or sampled.

The relays 75 turn the solenoid valves on to supply water to the tanks, while relay 90 cuts off the solenoid valves by opening the holding circuits for the relays 75.

To stop the automatic advance operation of the stepping magnet, switches 65 and 66 should be moved to their respective extreme right hand positions. In this position power will be removed from the motor 71. Manual switch 95 can then be closed to advance manually the stepping magnet to any desired position.

We claim:

1. The method of automatically controlling the chemical concentration of solutions in different tanks according to preselected settings, which comprises sequentially measuring the electrolytic conductivity of the solutions in the different tanks for substantially equal time periods, automatically starting the admission, during the periods in which measurements are made, of liquids into those tanks in which the concentrations deviate from the preselected settings, repeating the cycle of operations, and on the repeated cycle automatically stopping the admission of liquids into those tanks in which the chemical concentrations have been restored to their respective settings by the time of the beginning of or during the respective periods in which the measurements are made.

2. The method of automatically controlling the chemical concentration of solutions in different tanks according to preselected settings, which comprises sequentially measuring the electrolytic conductivity of the solutions in the different tanks for substantially equal time periods, automatically starting the admission during the periods in which measurements are made, of liquids into those tanks in which the concentrations deviate from the preselected settings, visually indicating solely during the specific period of measurement which tank is being measured, visually indicating over an integral number of cycles of operations, including a single cycle of operations, which tanks are being supplied with liquids, repeating the cycle of operations, and on the repeated cycle automatically stopping the admission of liquids into those tanks in which the chemical concentrations have been restored to their respective settings by the time of the beginning or during the respective periods in which the measurements are made.

3. An automatic rinse tank controller adapted to maintain the quality of water in a plurality of tanks according to predetermined chemical concentrations, comprising a plurality of Wheatstone bridge circuits corresponding in number to the number of tanks to be controlled, a conductivity cell in an arm of each bridge circuit for immersion in an individual tank, each of said bridge circuits having a conductivity setting to determine the point of balance of said bridge and also having an output circuit adapted to control an individual water valve for its associated tank, the conductivity setting for one of said bridge circuits being different from that of another bridge circuit, a switch serially arranged in the path between each conductivity cell and its associated bridge circuit, and timing means for sequentially connecting the different bridge circuits to their respective cells for equal predetermined time periods, said timing means including a motor, a cam, and a stepping magnet controlled by said cam.

4. An automatic rinse tank controller adapted to maintain the quality of water in a plurality of tanks according to predetermined chemical concentrations, comprising a plurality of Wheatstone bridge circuits corresponding in number to the number of tanks to be controlled, a conductivity cell in an arm of each bridge circuit for immersion in an individual tank, each of said bridge circuits having a conductivity setting to determine the point of balance of said bridge and also having an output circuit adapted to control an individual water valve for its associated tank, a switch serially arranged in the path between each conductivity cell and its associated bridge circuit, and a stepping magnet including a winding and a timing mechanism for successfully operating said magnet, thereby sequentially connecting the different bridge circuits to their respective conductivity cells for equal predetermined time periods, said timing mechanism including an electrically operated motor, means for bypassing said timing mechanism and for manually operating said stepping magnet, said stepping magnet having a plurality of arcuate rows of contacts, said switch including contacts on two of said rows, and position indicators for the different bridges in circuit with different contacts on still another arcuate row.

5. An automatic rinse tank controller as defined in claim 4, wherein the output circuits for said bridges comprise electromagnetic relays, there being locking circuits for the respective relays in circuit with different contacts on still another one of said arcuate rows.

6. An automatic rinse tank controller adapted to maintain the quality of water in a plurality of tanks according to predetermined chemical concentrations, comprising a plurality of Wheatstone bridge circuits corresponding in number to the number of tanks to be controlled, a conductivity cell in an arm of each bridge circuit for immersion in an individual tank, each of said bridge circuits having a conductivity setting to determine the point of balance of said bridge and also having an output circuit adapted to control an individual water valve for its associated tank, the conductivity setting for one of said bridge circuits being different from that of another bridge circuit, a switch serially arranged in the path between each conductivity cell and its associated bridge circuit, and a stepping magnet including a timing circuit for sequentially connecting the different bridge circuits to their respective conductivity cells for equal predetermined time periods, said timing circuit including the series circuit of a pair of contacts, a rectifier and the winding of said stepping magnet, means for applying alternating current to said rectifier, a cam controlling the opening and closing of said contacts, and a motor driving said cam, whereby a pulse of current is applied to the winding of said stepping magnet each time the cam closes said contacts, said stepping magnet having a plurality of arcuate rows of contacts, said switch including contacts on two of said rows, and position indicators for the different bridges in circuit with different contacts on still another arcuate row.

7. An automatic rinse tank controller as defined in claim 6, including a manually operated switch connected across said pair of contacts.

8. An automatic rinse tank controller adapted to maintain the quality of water in a plurality of tanks according to predetermined chemical concentrations, said tanks having individual water inlets and a valve for each inlet, comprising a plurality of Wheatstone bridge circuits corresponding in number to the tanks to be controlled, a conductivity cell in an arm of each bridge circuits having a conductivity setting to determine the point of bridge balance of said bridge and also having an output circuit adapted to control an individual water valve for its associated tank, the conductivity setting for one of said bridge circuits being different from that of another bridge circuit, a switch serially arranged in the path between each conductivity cell and its associated bridge circuit, and a stepping magnet including a timing circuit for sequentially connecting the different bridge circuits to their respective conductivity cells for equal predetermined time periods, said timing circuit including the series circuit of a pair of contacts, a rectifier and the winding of said stepping magnet, means for applying alternating current to said rectifier, a cam controlling the opening and closing of said contacts, and a motor driving said cam, whereby a pulse of current is applied to the winding of said stepping magnet each time the cam closes said contacts, said switch including contacts on at least one of said rows, a relay in the output of each of said Wheatstone bridges, a second relay under the control of and energized by the operation of said first relay, said second relay including a pair of make contacts, a circuit for energizing the inlet valve for the tank associated with said relays through said pair of contacts upon operation of said second relay, a third relay common to all of said second relays, said third relay having a pair of break contacts, and circuit connections from the winding of said second relay including the make contacts thereof and the break contacts of the third relay for locking up said second relay when it is energized.

9. In electroplating apparatus, an automatic rinse tank controller adapted to maintain the quality of water in a plurality of tanks according to predetermined chemical concentrations, comprising a plurality of Wheatstone bridge circuits corresponding in number to the number of tanks to be controlled, a conductivity cell in an arm of each bridge circuit for immersion in an individual tank, each of said bridge circuits having a conductivity setting to determine the point of balance of said bridge and also having an output circuit adapted to control an individual water valve for its associated tank, the conductivity setting for one of said bridge circuits being different from that of another bridge circuit, a switch serially arranged in the path between each conductivity cell and its associated bridge circuit, a stepping magnet for sequentially operating said switches to thereby sequentially connect the different bridge circuits to their respective cells for equal predetermined time periods, and timing mechanism including a motor for periodically advancing said stepping magnet.

10. An automatic rinse tank controller adapted to maintain the quality of liquid in a plurality of tanks according to predetermined chemical concentrations, comprising a plurality of bridge circuits corresponding in number to the tanks to be controlled, a conductivity cell in an arm of each bridge circuit for immersion in an individual tank, each of said bridge circuits having a conductivity setting to determine the point of balance of said bridge and also having an output circuit adapted to control an individual inlet valve for its associated tank, switching mechanism including contacts serially arranged in the path between each conductivity cell and its associated bridge circuit, first means including a timer for sequentially and automatically operating said switching mechanism to thereby sequentially connect the different bridge circuits to their respective cells for equal time periods, holding circuit means for maintaining the output of each bridge circuit even after its conductivity cell has been disconnected therefrom, and second means operative simultaneously with said first means for momentarily disabling the outputs from said bridges during the actual switching interval, but without affecting said holding circuit means.

11. An automatic rinse tank controller adapted to maintain the quality of liquid in a plurality of tanks according to predetermined chemical concentrations, comprising a plurality of bridge circuits corresponding in number to the tanks to be controlled, a conductivity cell in an arm of each bridge circuit for immersion in an individual tank, each of said bridge circuits having a conductivity setting to determine the point of balance of said bridge and also having an output circuit adapted to control an individual inlet valve for its associated tank, switching mechanism including contacts serially arranged in the path between each conductivity cell and its associated bridge circuit, first means for sequentially operating said switching mechanism to thereby sequentially connect the different bridge circuits to their respective cells for equal time periods, and second means operative simultaneously with said first means for momentarily disabling the outputs from said bridges during the actual switching interval, each bridge being provided with a relay having a voltage on its armature, said switching mechanism including a stepping magnet having a winding, said first means including circuit connections to said winding and a cam for interrupting the continuity of said circuit connections, said second means including a relay having an operating winding in shunt to the winding of said stepping magnet, said last relay when energized, functioning to remove the voltage from the relay in each bridge circuit.

12. An automatic tank controller for automatically controlling the chemical concentrations of solutions in different tanks according to preselected settings, comprising means for sequentially measuring the electrolytic conductivity of the solutions in the different tanks for substantially equal time periods, means for automatically starting the admission, during the periods in which measurements are made, of liquid into those tanks in which the concentrations deviate from the preselected settings, means for repeating the cycle of operations, and means on the repeated cycle for automatically stopping the admission of liquids into those tanks in which the chemical concentrations have been restored to their respective settings by the time of the beginning of or during the repective periods in which measurements are made.

References Cited in the file of this patent

UNITED STATES PATENTS

| | | |
|---|---|---|
| 1,296,250 | Wyss | Mar. 4, 1919 |
| 1,530,833 | Keeler | Mar. 24, 1925 |
| 1,576,001 | Olden | Mar. 9, 1926 |
| 1,830,333 | Parker | Nov. 3, 1931 |
| 1,870,982 | Behr | Aug. 9, 1932 |
| 2,221,307 | Christie | Nov. 12, 1940 |
| 2,651,751 | Heath | Sept. 8, 1953 |